(12) United States Patent
Tang et al.

(10) Patent No.: US 12,705,465 B2
(45) Date of Patent: Aug. 11, 2026

(54) METHOD FOR OPERATING NEURAL NETWORK

(71) Applicants: TAIWAN SEMICONDUCTOR MANUFACTURING COMPANY, LTD., Hsinchu (TW); NATIONAL TSING HUA UNIVERSITY, Hsinchu City (TW)

(72) Inventors: Kea Tiong Tang, Taipei City (TW); Chen-Han Hsu, Keelung City (TW)

(73) Assignees: TAIWAN SEMICONDUCTOR MANUFACTURING COMPANY, LTD., Hsinchu (TW); NATIONAL TSING HUA UNIVERSITY, Hsinchu City (TW)

( * ) Notice: Subject to any disclaimer, the term of this patent is extended or adjusted under 35 U.S.C. 154(b) by 1033 days.

(21) Appl. No.: 17/734,221

(22) Filed: May 2, 2022

(65) Prior Publication Data

US 2023/0351165 A1 Nov. 2, 2023

(51) Int. Cl.

*G06N 3/049* (2023.01)
*G06N 3/063* (2023.01)
*G06N 3/08* (2023.01)
*G06V 10/82* (2022.01)

(52) U.S. Cl.

CPC ............... *G06N 3/049* (2013.01); *G06N 3/08* (2013.01)

(58) Field of Classification Search

CPC ............ G06N 5/022; G06N 5/01; G06N 5/04; G06N 20/20

See application file for complete search history.

(56) References Cited

U.S. PATENT DOCUMENTS

2018/0225563 A1* 8/2018 Kim ......................... G06N 3/08
2020/0202206 A1* 6/2020 Rummens ............... G11C 11/54

OTHER PUBLICATIONS

Ozdamar et al., "Detection of Spikes with Artificial Neural Networks Using Raw EEG" Computers and Biomedical Research 31, 122-142 (1998) (Year: 1998).*

Bo Wang et al., "Shenjing: A low power reconfigurable neuromorphic accelerator with partial-sum and spike hetworks-on-chip", DATE '20: Proceedings of the 23rd Conference on Design, Automation and Test in Europe, 2020.

Srivatsa P et al., "You Only Spike Once: Improving Energy-Efficient Neuromorphic Inference to ANN-Level Accuracy", arXiv:2006.09982v2, 2020.

* cited by examiner

*Primary Examiner* — Kakali Chaki
*Assistant Examiner* — Josep Han
(74) *Attorney, Agent, or Firm* — Maschoff Brennan

(57) ABSTRACT

A method is provided and includes operations as below: receiving multiple spike signals in an input layer of a spiking neural network during multiple time steps; counting a corresponding number of spikes in the spike signals for each of the time steps; weighting, in response to the corresponding number of spikes in one of plurality of time steps being greater than a predetermined count value, the spike signals with multiple synaptic weight values to generate multiple synaptic signals; generating a membrane potential by accumulating a number N of the synaptic signals according to a weight distribution of the synaptic weight values; and generating an output spike signal according to the membrane potential.

20 Claims, 9 Drawing Sheets

METHOD FOR OPERATING NEURAL NETWORK

BACKGROUND

Neuromorphic and synaptronic systems, also referred to as artificial neural networks, are computational systems that permit electronic systems to essentially function in a manner analogous to that of biological brains, and create connections between processing elements that are roughly functionally equivalent to neurons of a biological brain. Neuromorphic and synaptronic systems may comprise various electronic circuits that are modeled on biological neurons. Artificial neural networks represent one of the most relevant and widespread techniques used to learn and recognize patterns, and consequently, have emerged as an effective solution for intuitive human/device interactions that improve user experience, a new computation paradigm known as "cognitive computing." Among other usages, ANNs can be used for imaging processing, voice and object recognition or natural language processing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
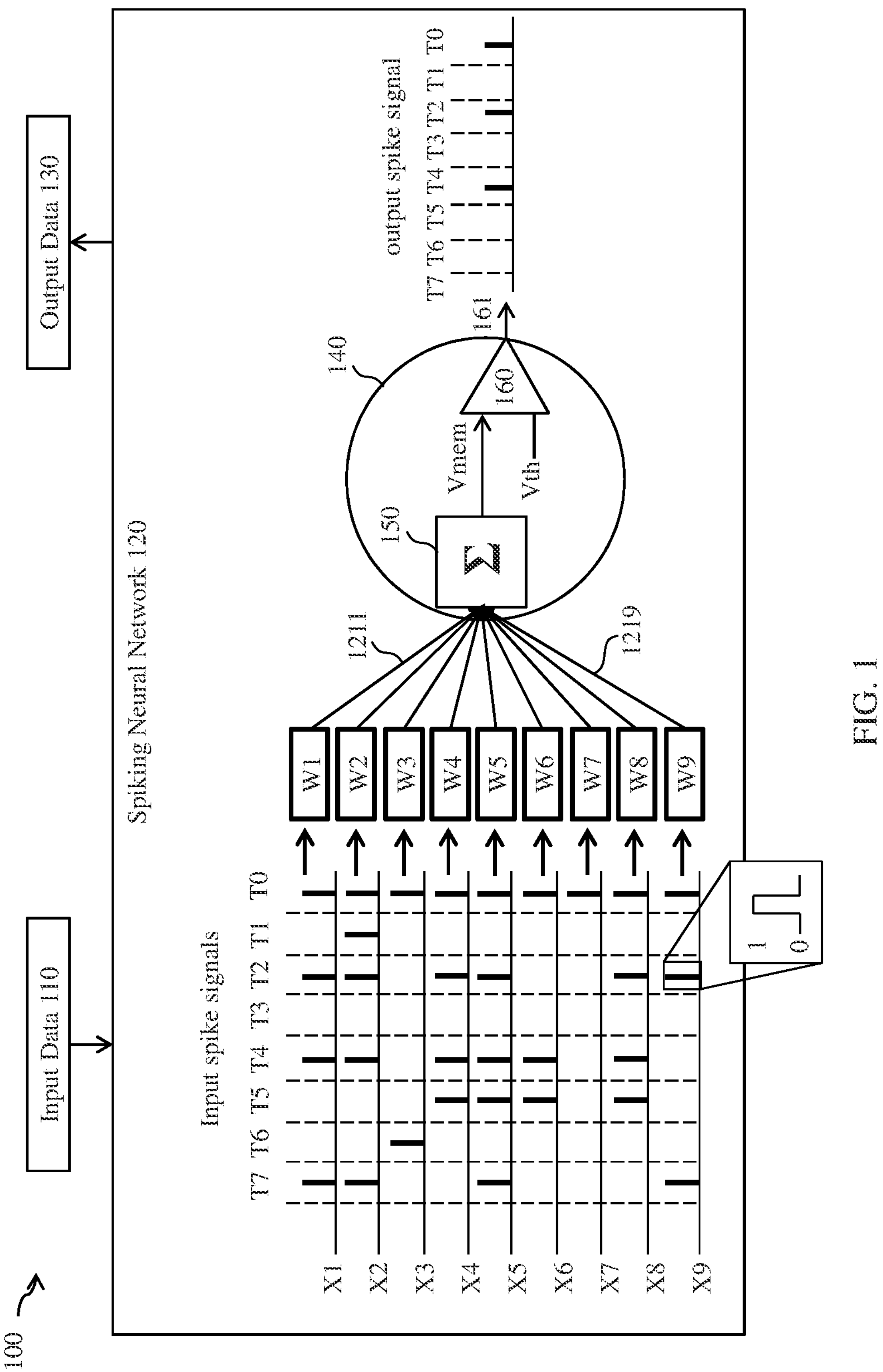
FIG. 1 is a schematic diagram illustrating a process of performing a neural network implementing one of a detection or classification application, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Within a spiking neural network, "spikes" are transmitted between neurons. This characteristic of spiking neural networks may be leveraged to implement power-optimized neural networks. For example, the spiking neural network utilizes a particular neuron model that suppresses activity in portions of the spiking neural network, thereby allowing the spiking neural network to consume less power than other types of neural networks. Activity may be suppressed by using a thresholding model for neurons in the spiking neural network. Unless a feature is sufficiently strong in a given neural, the response in the spiking neural network is zero (0)

or no spikes being generated. These power optimized neural networks may be implemented in a variety of different types of devices and/or systems including, but not limited to, consumer devices, servers, cloud server applications, and the like.

This application relates to spiking neural networks. More particularly, the application relates to initiate accumulation of spike signals based on the number of spikes and a weight distribution of synaptic weight values in a spiking neural network.

Reference is now made to FIG. 1. FIG. 1 is a schematic diagram illustrating a neural network system 100 using a spiking neural network, in accordance with some embodiments. In some embodiments, the neural network system 100 is implemented in a (computing) device 310 of FIG. 3 and a device 700 of FIG. 7 using methods 200A to 200C in FIGS. 2, 5A-5B and 6A-6B below.

For illustration, the neural network system 100 includes a spiking neural network 120 that receives input data 110 and accordingly outputs output data 130. In some embodiments, the neural network system 100 is configured to implement one of a detection or classification applications using the spiking neural network 120. For example, in some embodiments, the input data 110 is media information (e.g., images, audio, video data) or electrical signals for detection, classification, recognition, adjustment, conversion or any suitable applications. Accordingly, the neural network system 100 receives the input data 110 and outputs spike(s) corresponding to detected/recognized feature(s) in the received input data 110, and further outputs value(s) corresponding to the output spikes as the output data 130.

In some embodiments, in a basic form of the spiking neural network 120 it includes nodes, called neurons, and edges, called synapses, between nodes. A neuron is adapted to perform two functions: accumulate "membrane potential," and "spike." The membrane potential resembles an accumulating comparator, such that when the membrane potential becomes high enough, the neuron spikes. Unlike the conventional analog neuron models which compute and transmit the continuous-valued signals, the spiking neuron uses the discrete spike streams (signals in which each includes multiple spikes(pulses)) to process signals or information, and is commonly referred to as a "presynaptic neuron." As shown in FIG. 1, a spike has a first value "0" (e.g., in some embodiments, being referred to as "no spike" state) or a second value "1" (e.g., in some embodiments, being referred to as "spike" state). When the presynaptic neuron spikes, it sends out spike signal to all target neuron(s) of the presynaptic neuron, called "postsynaptic neuron(s)." Each of these spike signal has a "synaptic weight value" associated with it, and these synaptic weight values may be positive or negative, increasing or decreasing the postsynaptic neuron's potential.

In FIG. 1, each of synaptic signals 1211-1219 is generated by a corresponding one of weighting spike signals X1-X9 with a corresponding one of synaptic weight values W1-W9. For example, for the time step T0, a value of the synaptic signal 1211 is a product of a spike, having the value "1", in the spike signal X1 and the synaptic weight value W1, and accordingly is equal to W1. An adder 150 sums up the synaptic signals 1211-1219 to generate a membrane potential Vmem that is further compared with a threshold value Vth by a comparator 160 to generate an output spike signal 161. When the membrane potential Vmem corresponding to a certain time step (e.g., the time step T0) is greater than the threshold value Vth, a spike having the value "1" is generated in the output spike signal for the certain time step (e.g., the time step T0). In some embodiments, the spiking neural network 120 generates an output signal including the output data 130 based on the output spike signal 161 for an image recognition operation of the input data 110 which is associated with the spike signals X1-X9.

Figure 2:
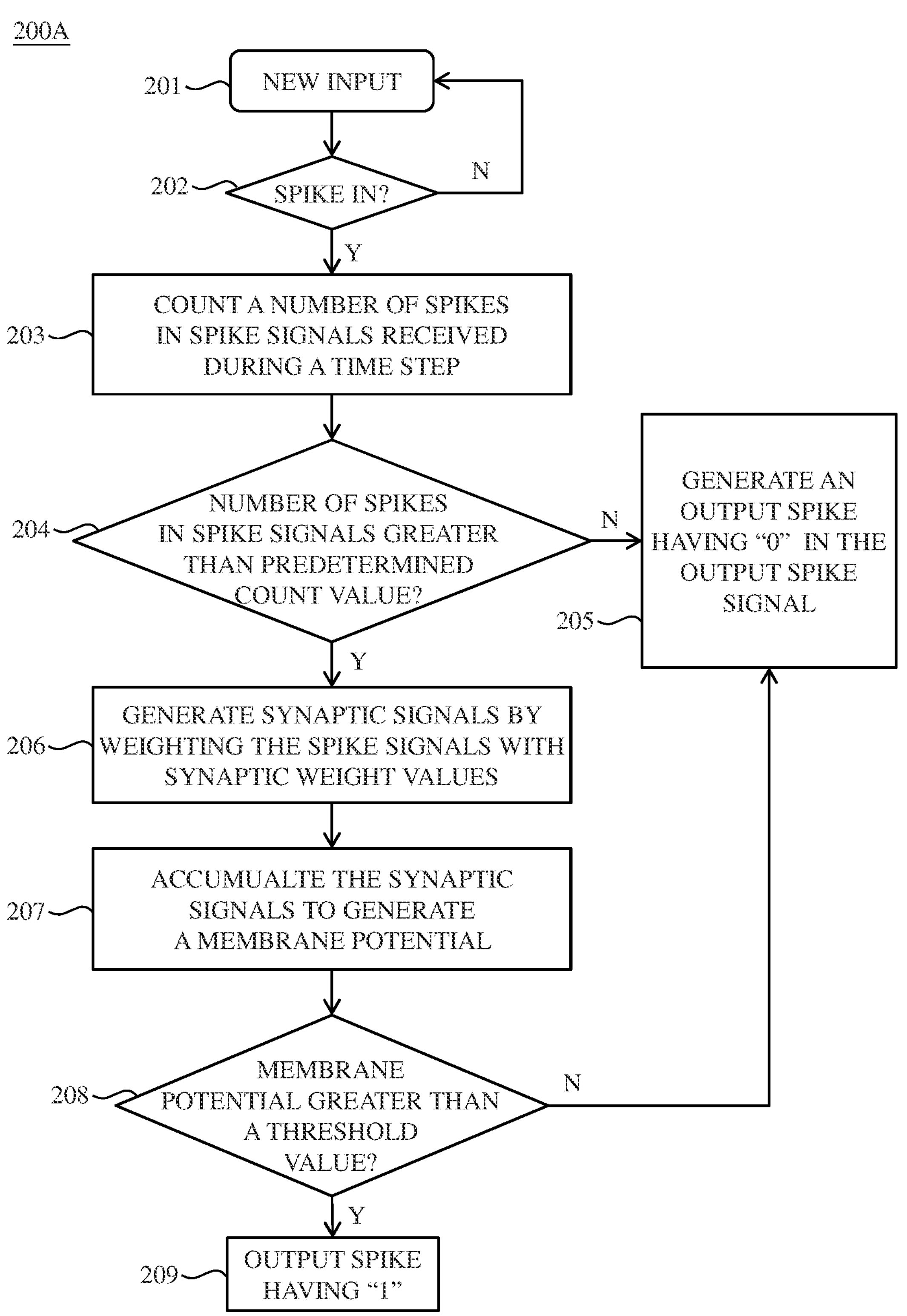
FIG. 2 is a flow chart of an example of a method for operating a spiking neural network operation, in accordance with some embodiments.

In the following paragraphs, the operations of the spiking neural network 120 are discussed with reference to FIGS. 2-7. FIG. 2 is a flow chart of an example of a method 200A for operating the spiking neural network 120, in accordance with some embodiments. It is understood that additional operations can be provided before, during, and after the processes shown by FIG. 2, and some of the operations described below can be replaced or eliminated, for additional embodiments of the method. The order of the operations/processes may be interchangeable. Throughout the various views and illustrative embodiments, like reference numbers are used to designate like elements. The method 200A includes operations 201-209 that are described below with reference to the neural network system 100 of FIG. 1 and a neural network accelerator 320 of FIG. 3.

Figure 3:
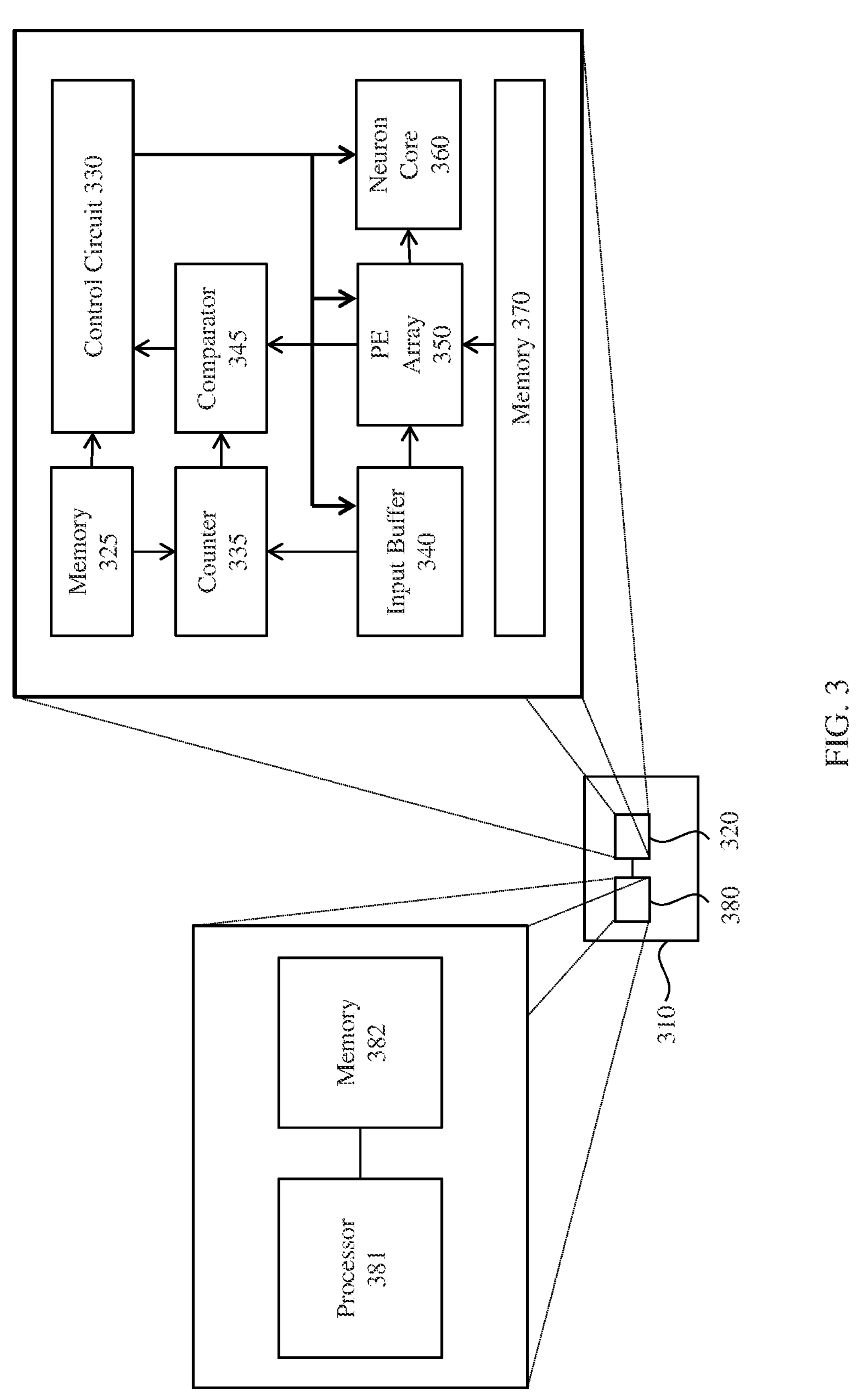
FIG. 3 is a schematic diagram illustrating an overview of a hardware accelerator for a spiking neural network, in accordance with some embodiments.

FIG. 3 is a schematic diagram illustrating an overview of the neural network accelerator 320 for the spiking neural network 120, in accordance with some embodiments. In some embodiments, the neural network accelerator 320 is on a die to form a neural chip (referred to as an accelerator chip). Several neural chips are packaged and networked together and included in any number of devices 310, such like servers, mobile devices, sensors, actuators, etc. For illustration, in the embodiments of FIG. 3, the neural network accelerator 320 includes a memory 325, a control circuit 330, a counter 335, an input buffer (circuit) 340, a comparator 345, a processing element (PE) array 350 including multiple processing circuit, a neuron core (circuit) 360, and a memory 370.

In some embodiments, the memory 325 is configured to store and provide operation parameters of the spiking neural network 120, such likes, a predetermined count value, a threshold value for determination of firing output spikes, and a weight distribution, of the synaptic weight values, indicating input spike signals, corresponding synaptic weight values, maximum and minimum values of the synaptic weight values etc., to the control circuit and the counter 335. The counter 335 is configured to count a number of spikes in multiple input spike signals received during each of time steps of the spiking neural network 120. The input buffer 340 is configured to provide data, such like input spike signals, to the counter 335 and the processing elements array 350. The comparator 345 is configured to compare the counted number of spikes receives from the counter 335 with the predetermined count value to generate a comparison signal to the control circuit 330 for further operation.

The processing element array 350 is configured to take charge of the majority of computation tasks in the spiking neural network 120, for example, including accumulation and comparison, based on the input spikes and weight values accessed from the memory 370. In various embodiments, the processing element array 350 is further configured to generate intermediate membrane potential to the comparator 345 for determining to terminate accumulation of synaptic signals. The neuron core 360 is configured to generate output spikes in response to a control signal from the control circuit 330 and to store the corresponding output data. The control circuit 330 is configured to fetch instructions from an external memory (e.g., a memory 382) and decodes them to orchestrate all components in the neural network accelerator 320. In some embodiments, with the techniques discussed herein in FIG. 1, the synaptic weight values W1-W9 are stored in the memory 370.

In some embodiments, the work of processing functions of the spiking neural network 120 (e.g., the operations of the postsynaptic neuron 140) is configured to be divided between the components in the neural network accelerator 320.

In some embodiments, the neural network accelerator 320 is referred to as a programmable logic chip, implemented by System-On-a-Chip (SOC), coupled to a processing system 380 in the device 310, by a direct memory access (DMA) circuit. For example, the processing system 380 includes a processor 381 running programs to orchestrate the neural network operations in the neural network accelerator 320 via configuring a DMA circuit (not shown) to transfer data and instructions between a memory 382 on the processing system 380, the input buffer 340 and the neuron core 360. In some embodiments, the processor 381 in the processing system 380 is implemented by a general-purpose processor, and the memory 382 stores data, instructions (programming codes), parameters corresponding to the spiking neural network 120.

Reference now is made to the method 200A and FIGS. 1-3. In operation 201, the input data 110 is provided to the spiking neural network 120. In some embodiments, the input data 110 are encoded into the binary spike signals X1-X9 to process information of the input data 110, as shown in FIG. 1.

In operation 202, the spiking neural network 120 is driven in response to receiving the spike signals X1-X9. In some embodiments, when the spike signals are received in an input layer of the spiking neural network 120, the operation 203 is performed; otherwise, the operation 201 is perform to obtain the input data 110.

In operation 203, a corresponding number of spikes in the spike signals X1-X9 received during a time step is counted by the counter 335. In some embodiments, spikes received during each of time steps are counted. For example, in the embodiments of FIG. 1, a number of the spikes (shown as a thin black bar, indicating the spikes have the value "1") in the spike signals X1-X9 received during the time step T0 is 9. A number of the spikes in the spike signals X1-X9 received during the time step T1 is 1. A number of the spikes in the spike signals X1-X9 received during the time step T2 is 6. A number of the spikes in the spike signals X1-X9 received during the time step T3 is 0. A number of the spikes in the spike signals X1-X9 received during the time step T4 is 6. A number of the spikes in the spike signals X1-X9 received during the time step T5 is 4. A number of the spikes in the spike signals X1-X9 received during the time step T6 is 1. A number of the spikes in the spike signals X1-X9 received during the time step T7 is 4.

In some embodiments, the method 200A further includes operations of increasing the corresponding number of spikes for a certain one in the time steps in response to a certain signal, in the spike signals, including a spike having a value "1" in the certain time step of the time steps. For example, when the spike signal X3 has a spike during the time step T3, the number of spikes for the time step T3 increases by 1.

In operation 204, the number of spikes is compared with the predetermined count value by the comparator 345. In response to the comparison, when the number of spike is less than the predetermined count value, the operation 205 is performed; otherwise, the operation 206 is performed. Specifically, in some embodiments, based on the weight distribution stored in the memory 325, maximum and minimum values of the synaptic weight values W1-W9 in the spiking neural network 120 are −8 and +7 respectively, and the threshold value Vth is 32. In order to fire a spike, the adder 150 must at least sum up 5 synaptic signals to generate the membrane potential Vmem that is greater than the threshold value Vth. Accordingly, in the embodiments above, the predetermined count value equals to 5. In various embodiments, because the synaptic weight values W1-W9 are obtained in the training stage of the spiking neural network 120, the predetermined count value is obtained correspondingly and further stored in the memory 325 for operation after training.

In operation 205, the postsynaptic neuron 140 generates an output spike having the value "0" or does not generate spike in the output spike signal 161 corresponding to the certain time step, as shown in FIG. 1. Alternatively stated, operations of weighting and accumulation associated with the spike signals received during the certain time step are terminated. For example, in the embodiments of FIG. 1, the numbers of spikes received during the time steps T1, T3, and T5-T7 (e.g., "1", "0", "4", "1", and "4") are smaller than the predetermined count value "5". Accordingly, no spike (i.e., spikes having the value "0") is in the output spike signal 161 corresponding to the time steps T1, T3, and T5-T7.

In some embodiments, the method 200A further includes operations of determining that no spike is received during a time step and in response to the determination, generating the output spike having the value "0" in the output spike signal 161 corresponding to the time step. For example, for the time step T3 in which the number of spikes equals "0", no spike (i.e., spikes having the value "0") is in the output spike signal 161 corresponding to the time step T3.

In operation 206, the synaptic signals are generated by weighting the spike signals with the corresponding synaptic weight values. For instance, continued with the embodiments mentioned above, the numbers of spikes received during the time steps T0, T2, and T4 (e.g., "9", "6", and "6") are greater than the predetermined count value "5", and accordingly, the synaptic signals 1211-1219 corresponding to the time step T0 are generated by weighting the spike signals X1-X9 with the synaptic weight values W1-W9.

In operation 207, the adder 150 (in some embodiments, configured in the PE array 350) of the postsynaptic neuron 140 receives and accumulates the synaptic signals 1211-1219 to generate the membrane potential Vmem, corresponding to time steps in which the operation of accumulation is performed, to the comparator 160. For example, in the embodiments of FIG. 1, a membrane potential Vmem,0 corresponding to the time steps T0 equals to a sum of the synaptic weight values W1-W9. A membrane potential Vmem,2 corresponding to the time steps T2 equals to a sum of the synaptic weight values W1-W2, W4-W5, and W8-W9. A membrane potential Vmem,4 corresponding to the time steps T4 equals to a sum of the synaptic weight values W1-W2, W4-W6, and W8.

In operation 208, the postsynaptic neuron 140 further compares the membrane potential Vmem with the threshold value Vth to determine to fire the output spike. When the membrane potential Vmem is less than threshold value Vth, the operation 205 is performed. When the membrane potential Vmem is greater than threshold value Vth, the operation 209 is performed.

In operation 209, the postsynaptic neuron 140 generates the spike having value "1" in the output spike signal 161 corresponding to the certain time step. For example, in some embodiments, when the membrane potentials Vmem,1, Vmem,2, Vmem,4 that correspond the time steps T0, T2, and T4, are greater than the threshold value Vth, as shown in FIG. 1, spikes (i.e., spikes having the value "1") are in the output spike signal 161 corresponding to the time steps T0, T2, and T4.

The configurations of FIGS. 1-3 are given for illustrative purposes. Various implements are within the complemented scope of the present application. For example, in some embodiments, number of input spike signals, values of the synaptic weight values, threshold values, etc., are different from the descriptions in the embodiments above.

In some approaches, a spiking neural network need to perform the accumulation of all synaptic signals for producing a membrane potential, which results in long execution time and power consumption that is a significant cost and limitation that may inhibit the scaling up of an application that utilizes a neural network.

With the configuration of the present application, the reduction of calculation by performing the accumulation operation in response to the number of spikes exceeding the predetermined count value translates into reduced power consumption and execution time when executing the spiking neural network, compared with some approaches. Alternatively stated, numbers of operations in the spiking neural network are not executed and consequently the performance of the spiking neural network increases, e.g., made to run or execute faster. The improvements in performance, whether for power consumption or execution time, allow systems that have constrained power and/or thermal budgets to implement spiking neural network 120 as described herein.

Figure 4A:
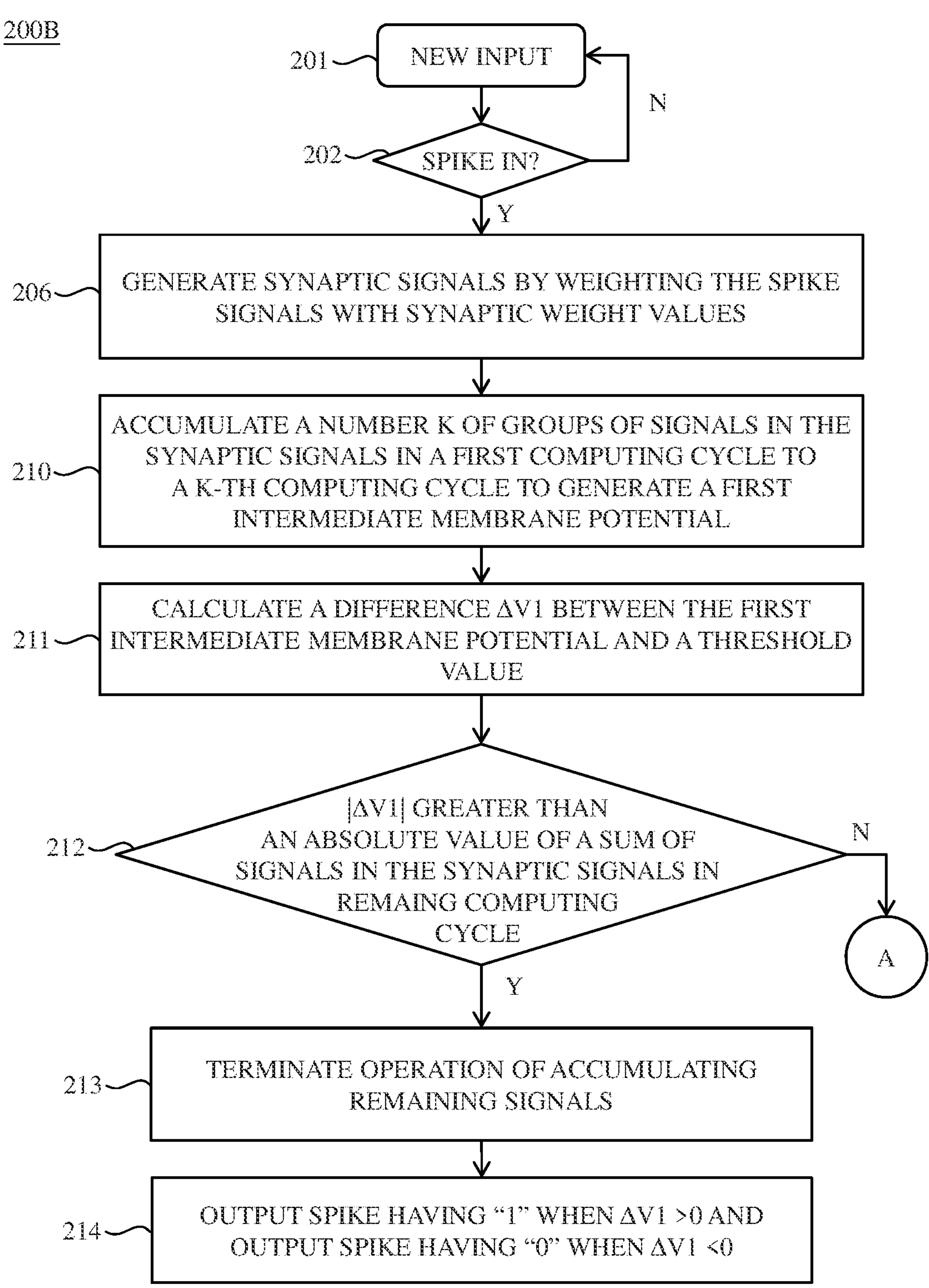
FIGS. 4A-4B illustrate a flow chart of an example of a method for operating the spiking neural network, in accordance with some embodiments.
Figure 4B:
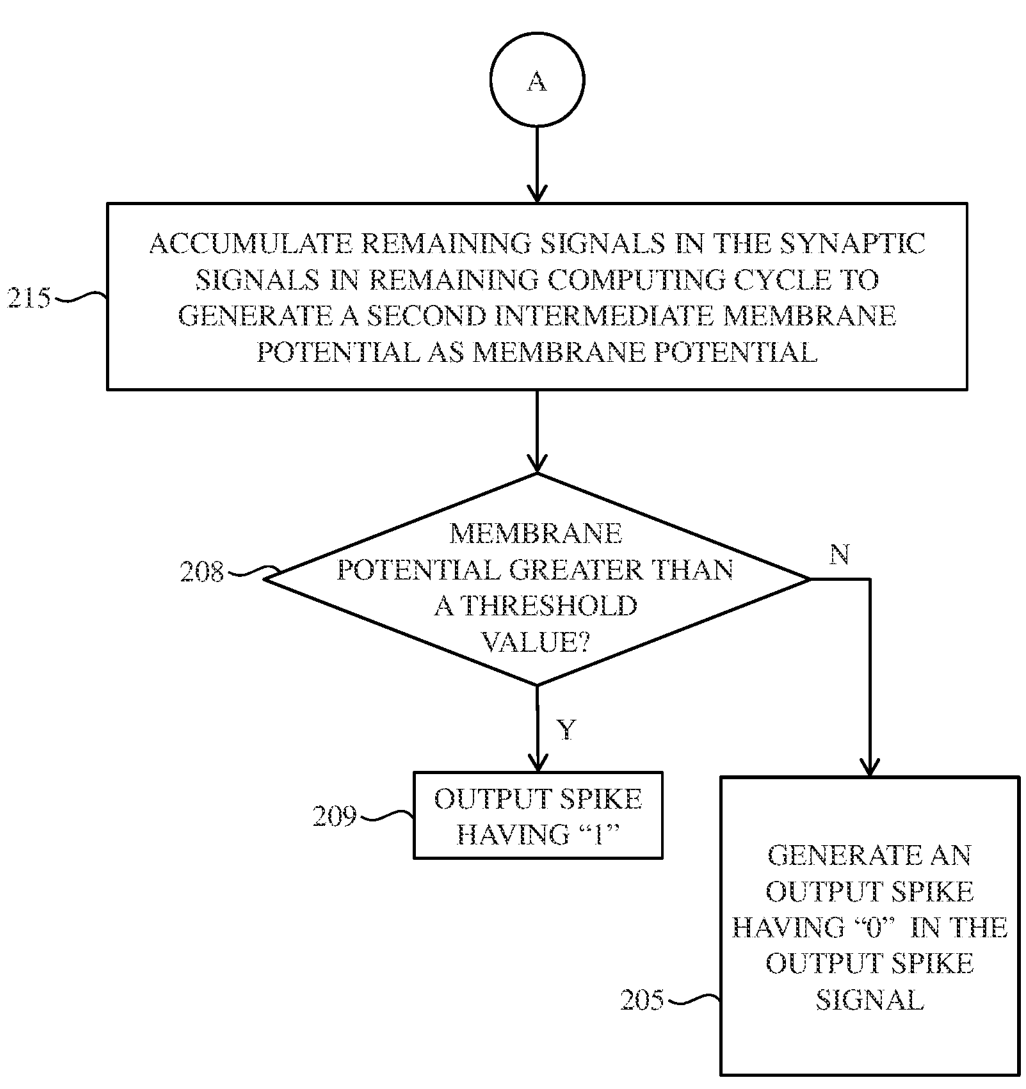
Figure 5A:
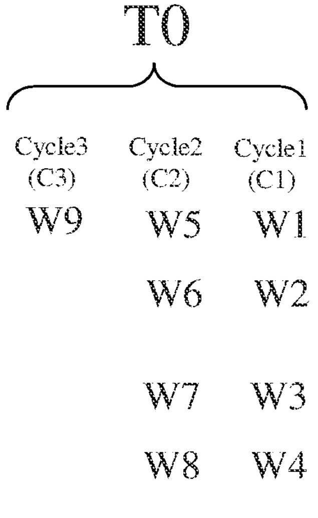
FIGS. 5A-5B illustrate a schematic diagram of performing an accumulation operation in a time step of a spike neural network, in accordance with some embodiments.
Figure 5A:
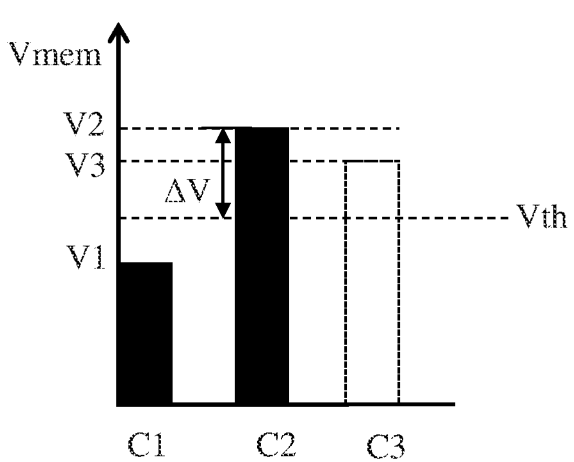
Figure 5B:
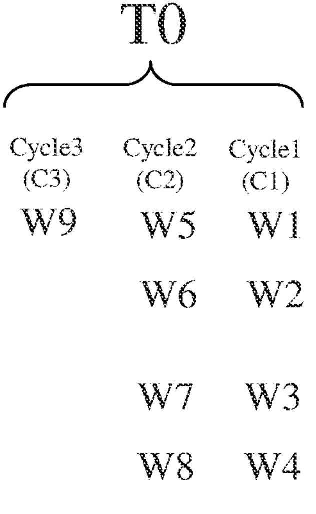
Figure 5B:
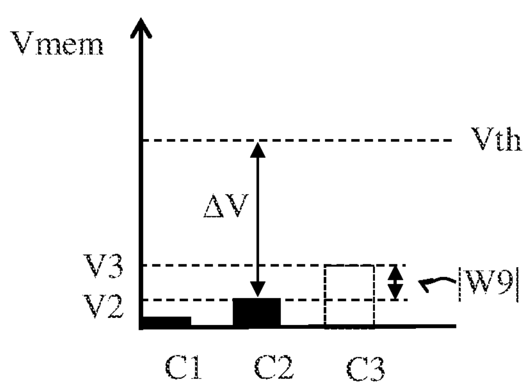

Reference is now made to FIGS. 4A-4B. FIGS. 4A-4B illustrates a flow chart of an example of a method 200B for operating the spiking neural network, in accordance with some embodiments. It is understood that additional operations can be provided before, during, and after the processes shown by FIGS. 4A-4B, and some of the operations described below can be replaced or eliminated, for additional embodiments of the method. The order of the operations/processes may be interchangeable. Throughout the various views and illustrative embodiments, like reference numbers are used to designate like elements. Compared with the method 200A of FIG. 2, the method 200B does not include operations 203-204, and 207 and further includes operations 210-215 after operation 206 that are described below with reference to FIGS. 1-5B. FIGS. 5A-5B illustrate a schematic diagram of performing an accumulation operation in a time step of the spike neural network 120, in accordance with some embodiments.

In some embodiments, after operations 201-202, the process of operations 206, 210-215, 208, 205 or 209 are performed for each time step. In operation 210, a number K of groups of signals in the synaptic signals in a first computing cycle to a K-th computing cycle are accumulated to generate a first intermediate membrane potential. Taking the embodiments of the time step T0 as an example, as illustratively shown in FIGS. 1 and 5A, the adder 150 accumulates the synaptic signals 1211-1214 in the computing cycle C1 to generate the membrane potential Vmem having a value V (e.g., a sum of W1-W4), and further accumulates the synaptic signals 1215-1218 in the computing cycle C2 to update the membrane potential Vmem to have a value V2 (e.g., a sum of W5-W8).

In operation 211, a difference ΔV (e.g., Vmem-Vth) between the membrane potential Vmem and the threshold value Vth is calculated by the comparator 345, as illustratively shown in FIG. 5A.

In operation 212, the difference ΔV is compared with a sum of signals in the synaptic signals in a (K+1)-th computing cycle by the comparator 345. Specifically, because a value of a synaptic signal in the spiking neural network 120 equals to a corresponding synaptic weight value, a sum of synaptic signals is calculated based on the weight distribution that is stored in the memory 325 and indicates the synaptic weight value corresponding to certain spike signal. For example, as shown in FIG. 5A, the only one synaptic signal 1219, having a value of the synaptic weight value W9, is arranged to be accumulated in the computing cycle C3. Based on the synaptic weight value W9 (e.g., a negative number) in the weight distribution, the membrane potential Vmem is predicted to have a value V3 by updating the membrane potential Vmem with the synaptic weight value W9, in which the value V3 is greater than the threshold value Vth. Alternatively stated, the sum corresponding to the computing cycle C3 is too small to influence the membrane potential Vmem. Without performing the operation of accumulation in the computing cycle C3, the membrane potential Vmem obtained in the previous computing cycles C1-C2 is high enough (the difference ΔV being positive and big enough) to meet the requirement of firing the spike in the output spike signal 161. Accordingly, operation 213 is performed to terminate operation of accumulating remaining synaptic signals, and the membrane potential Vmem is output by the adder 150 as the membrane potential that is compared with the threshold value Vth for generating the output spike. Sequentially, operation 214 is performed to output a spike having "1" in the output spike signal 161 corresponding to the time step T0 as the membrane potential Vmem is greater than the threshold value Vth.

In various embodiments, for example, as shown in FIG. 5B, based on the synaptic weight value W9 (e.g., a positive number) in the weight distribution, the synaptic weight value W9 is smaller than the difference ΔV, and the membrane potential Vmem is predicted to have a value V3 by updating the membrane potential Vmem with the synaptic weight value W9, in which the value V3 is smaller than the threshold value Vth. Alternatively stated, the sum corresponding to the computing cycle C3 is too small to influence the membrane potential Vmem. Without performing the operation of accumulation in the computing cycle C3, the membrane potential Vmem obtained in the previous computing cycles C1-C2 is predicted to be not high enough (the difference ΔV being negative) to meet the requirement of firing the spike in the output spike signal 161. Accordingly, operation 213 is performed to terminate operation of accumulating remaining synaptic signals, and the membrane potential Vmem is output by the adder 150 as the membrane potential that is compared with the threshold value Vth for generating the output spike. Sequentially, operation 214 is performed to output a spike having "0" in the output spike signal 161 corresponding to time step T0 as the membrane potential Vmem is smaller than the threshold value Vth.

Based on the embodiments mentioned above, a number of the synaptic signals, generated in the operation of weighting the spike signals, is different from the number of the synaptic signals being accumulated in operations 210-214. For illustration, in the embodiments of FIGS. 5A-5B, the number of the synaptic signals, generated in the operation of weighting the spike signals, equals 9, and the number of the synaptic signals being accumulated equals 8.

With reference to FIG. 4A, in operation 212, when an absolute value of the difference ΔV is less a sum of the synaptic signals in the remaining computing cycle (e.g., the computing cycle C3), the operation 215 in FIG. 4B is performed.

In operation 215, the synaptic signals in the remaining computing cycle are accumulated to generate a second intermediate membrane potential as the membrane potential Vmem to be compared with the threshold value Vth in order to fire the output spike signal 161. Alternatively stated, remaining signals in the synaptic signals in the last computing cycle corresponding to one time step is accumulated. For example, in some embodiments, when the sum of the remaining signals is a negative number and an absolute value of the sum of the remaining synaptic signals is greater than the difference ΔV, the sum the remaining cycle influences the membrane potential Vmem to be compared with the threshold value Vth in order to fire the output spike signal 161. Accordingly, the operation 215 is performed. Alternatively stated, the membrane potential Vmem, compared with the threshold value Vth in order to fire the output spike signal 161, is updated by the sum of the remaining synaptic signals in the last computing cycle.

Following operation 215, operations 208, 209 or 205 are performed. The configurations of operations 208, 209 or 205 are similar to those in FIG. 2. Hence, the repetitious descriptions are omitted here.

In some approaches, a spiking neural network generates a membrane potential after adders complete computation in all computing cycles corresponding to a time step. It not merely consumes significant hardware resources but also causes time latency in the spiking neural network.

With the configuration of the present application, by predicting the result of the computation in the last computing cycle based on a foreknown weight distribution, skipping the last computing cycle provides shorter execute time and further cut the power consumption during operations, compared with some approaches. Accordingly, the efficiency of the spiking neural network improves.

The configurations of FIGS. 4A-5B are given for illustrative purposes. Various implements are within the contemplated scope of the present disclosure. For example, in some embodiments, there are more than one synaptic signals arranged to be accumulated in the last computing cycle.

Figure 6A:
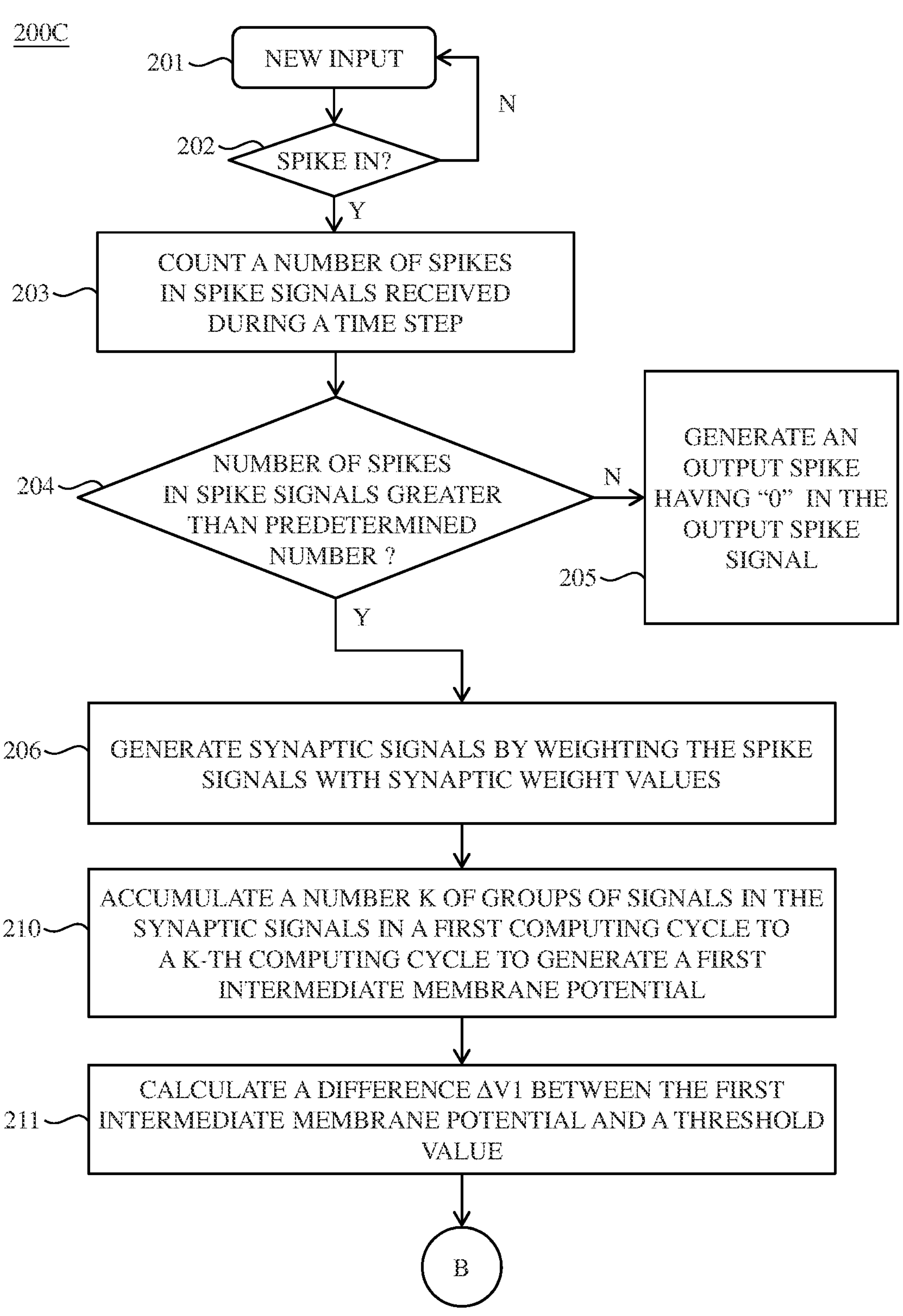
FIGS. 6A-6B illustrate a flow chart of an example of a method for operating the spiking neural network, in accordance with some embodiments.
Figure 6B:
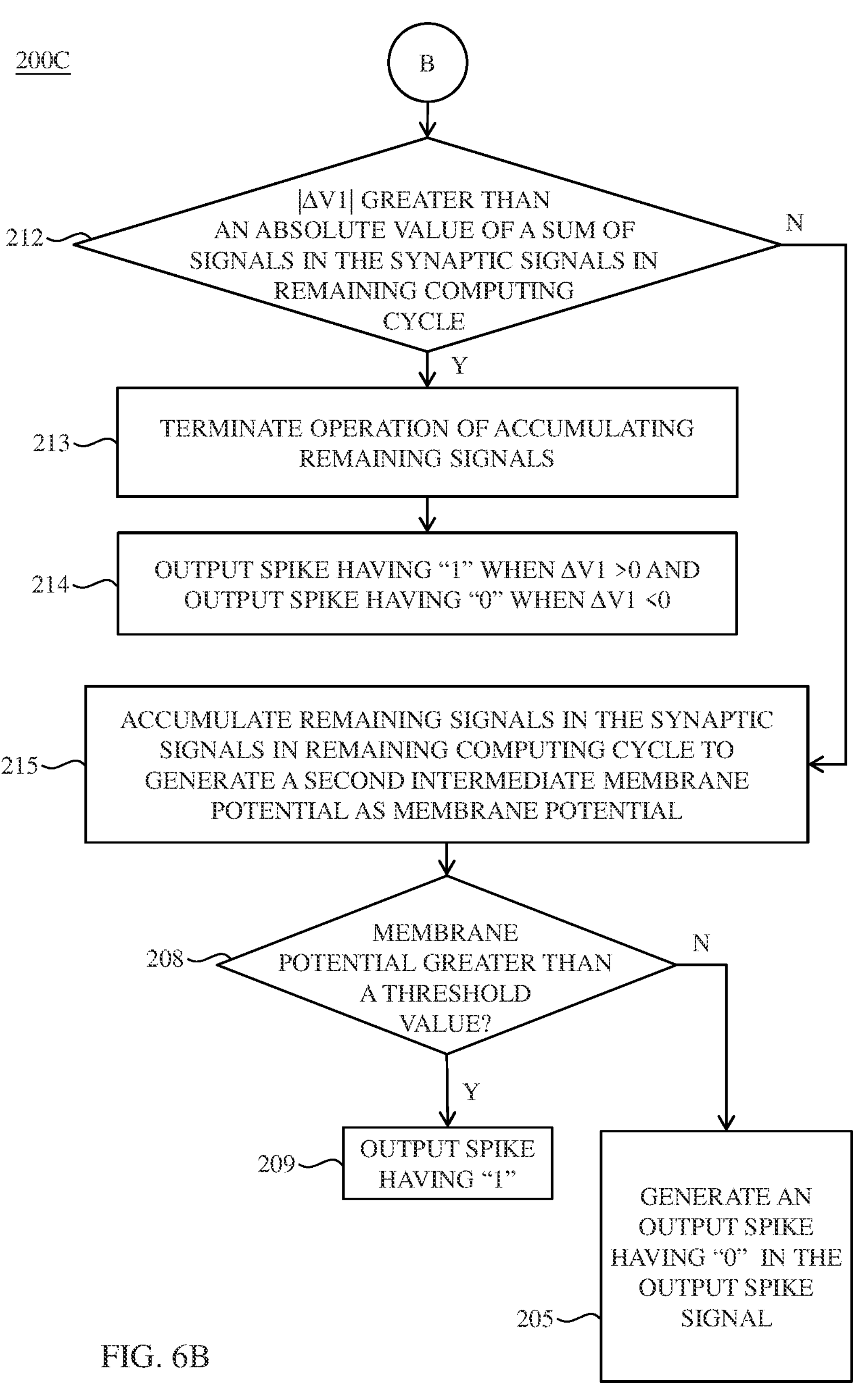

Reference is now made to FIGS. 6A-6B. FIGS. 6A-6B illustrate a flow chart of an example of a method 200C for operating the spiking neural network, in accordance with some embodiments. It is understood that additional operations can be provided before, during, and after the processes shown by FIGS. 6A-6B, and some of the operations described below can be replaced or eliminated, for additional embodiments of the method. The order of the operations/processes may be interchangeable. Throughout the various views and illustrative embodiments, like reference numbers are used to designate like elements.

In some embodiments, the method 200C in FIGS. 6A-6B integrates operations of the methods 200A and 200B. Specifically, the method 200C performs operations of 201-204, 205 or 206 based on the result of operation 204, and further operations 210-212 after 206. Based on the result of operation 212, operations 213-215 or operations 215, 208, 209 or 205 are performed.

Figure 7:
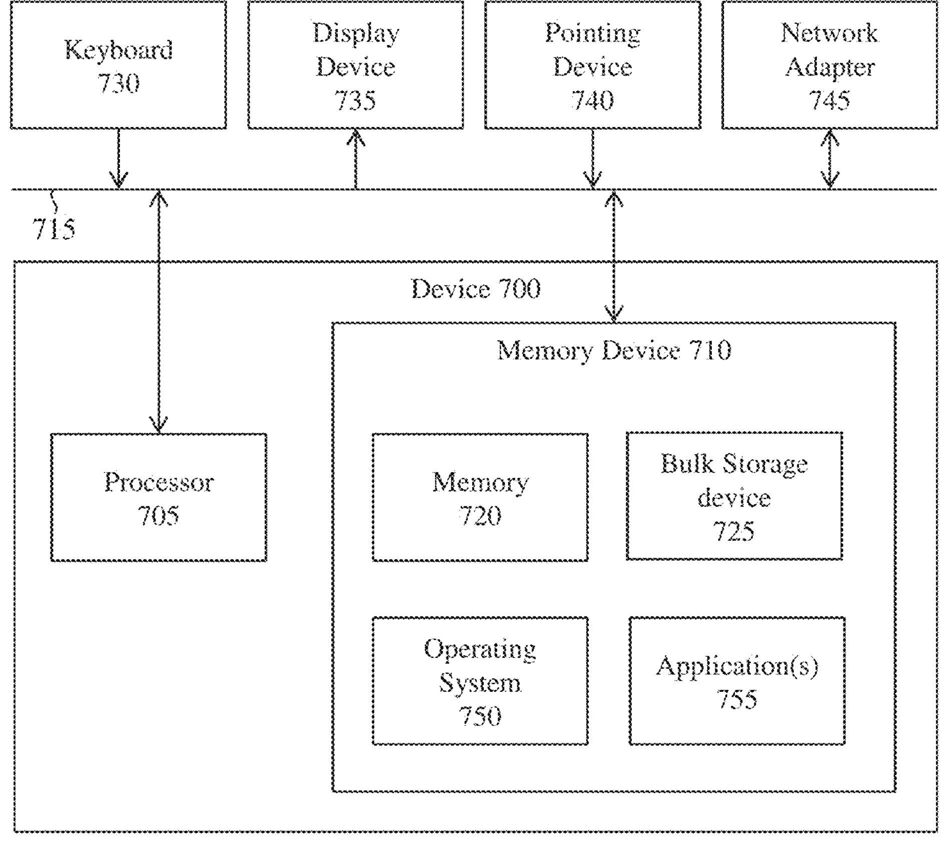
FIG. 7 is a block diagram illustrating an example of a data processing system used to implement a spiking neural network.

Reference is now made to FIG. 7. FIG. 7 is a block diagram illustrating an example of a device 700, for data processing, used to implement embodiments as described herein with reference to FIGS. 1-6B. In some embodiments, the device 700 is configured with respect to the device 310 of FIG. 3. As pictured, device 700 includes at least one processor, e.g., a central processing unit (CPU), 705 coupled to memory device 710 through a system bus 715 or other suitable circuitry. Device 700 stores computer readable instructions (also referred to as "program code") within memory device 710. Memory device 710 may be considered an example of computer readable storage media. Processor 705 executes the program code accessed from memory device 710 via system bus 715. In some embodiments, the processor 705 is configured with respect to, for example, the processor 381 of FIG. 3, and the memory device 710 is configured with respect to, for example, the memory 382 of FIG. 3.

Memory device 710 may include one or more physical memory devices such as, for example, a memory 720 and one or more bulk storage devices 725. Memory 720 refers to random access memory (RAM) or other non-persistent memory device(s) generally used during actual execution of the program code. Bulk storage device 725 may be implemented as a hard disk drive (HDD), solid state drive (SSD), or other persistent data storage device. Device 700 may also include one or more cache memories (not shown) that provide temporary storage of at least some program code in order to reduce the number of times program code must be retrieved from bulk storage device 725 during execution.

Input/output (I/O) devices such as a keyboard 730, a display device 735, a pointing device 740, and one or more network adapters 745 may be coupled to device 700. The I/O devices may be coupled to device 700 either directly or through intervening I/O controllers. In some cases, one or more of the I/O devices may be combined as in the case where a touchscreen is used as display device 735. In that case, display device 735 may also implement keyboard 730 and pointing device 740. Network adapter 745 may be used to couple device 700 to other systems, computer systems, remote printers, and/or remote storage devices through intervening private or public networks. Modems, cable modems, Ethernet cards, and wireless transceivers and/or radios are examples of different types of network adapter 745 that may be used with device 700. Depending upon the particular implementation of device 700, the specific type of network adapter, or network adapters as the case may be, will vary.

As pictured in FIG. 7, memory device 710 may store an operating system 750 and one or more applications 755. Application 755, for example, may be a neural network utility that, when executed, partitions a neural network. In one aspect, operating system 750 and application 755, being implemented in the form of executable program code, are executed by device 700 and, in particular, by processor 705. As such, operating system 750 and application 755 may be considered an integrated part of device 700. Operating system 750, application 755, and any data items used, generated, and/or operated upon by device 700 are functional data structures that impart functionality when utilized by device 700.

In one aspect, device 700 may be a computer or other device that is suitable for storing and/or executing program code. Device 700 may represent any of a variety of computer systems and/or devices that include a processor and memory and that are capable of performing the operations described within this disclosure. In some cases, the particular computer system and/or device may include fewer components or more components than described. Device 700 may be implemented as a single system as shown or as a plurality of networked or interconnected systems each having an architecture the same as, or similar to, that of device 700.

In one example, device 700 may receive a neural network as an input. Device 700, in executing operating system 750 and application 755, may partition the neural network and store the partitioned neural network within a memory or other computer-readable storage medium for later execution.

For practical applications, the methods 200A-200C and the neural network system 100 in the disclosure can be utilized in various fields such as machine vision, image classification, or data classification. For example, these methods and the neural network system 100 can be used in classifying medical images. For example, they can be used to classify X-ray images in normal conditions, with pneumonia, with bronchitis, or with heart disease. The methods can also be used to classify ultrasound images with normal fetuses or abnormal fetal positions. On the other hand, the methods 200A-200C and the neural network system 100 can also be used to classify images collected in automatic driving, such as distinguishing normal roads, roads with obstacles, and road conditions images of other vehicles. Furthermore, the methods 200A-200C and the neural network system 100 can be utilized in other similar fields, such like music spectrum recognition, spectral recognition, big data analysis, data feature recognition and other related machine learning fields.

Another embodiment in the disclosure is a non-transitory computer-readable medium (for example, the memory 382 in FIG. 3 and the memory device 710 in FIG. 7) containing at least one instruction program, which is executed by a processor (for example, the processor 381 in FIG. 3 and the processor 705 in FIG. 7) to perform the methods 200A-200C in the embodiments shown in FIGS. 2, 4A-4B, and 6A-6B.

As described above, the present application provides methods that reduce at least execute time and power consumed in operating a spiking neural network by performing operations in response to checking number of spikes in input spike signals and predicting the result of accumulation in the last computing cycle. Accordingly, the performance of the neural network system is enhanced.

In some embodiments, a method is provided and includes operations as below: receiving multiple spike signals in an input layer of a spiking neural network during multiple time steps; counting a corresponding number of spikes in the spike signals for each of the time steps; weighting, in response to the corresponding number of spikes in one of plurality of time steps being greater than a predetermined count value, the spike signals with multiple synaptic weight values to generate multiple synaptic signals; generating a membrane potential by accumulating a number N of the synaptic signals according to a weight distribution of the synaptic weight values; and generating an output spike signal according to the membrane potential.

In some embodiments, the method further includes operations of generating an output spike having a value "0" in the output spike signal corresponding to the first time step of the time steps when the corresponding number of spikes in a first time step of the time steps is smaller than the predetermined count value.

In some embodiments, the predetermined count value is configured to be obtained by training the spiking neural network.

In some embodiments, the counting the corresponding number of spikes in the spike signals further includes operations of increasing the corresponding number of spikes for a first time step of the time steps in response to a first spike signal, in the spike signals, including a spike having a value "1" in the first time step of the time steps.

In some embodiments, a number of the synaptic signals, generated in the operation of weighting the spike signals, equals to a number M. The number M is different from the number N.

In some embodiments, generating the membrane potential further includes operations below: accumulating a first group of signals in the synaptic signals in a first computing cycle to generate a first intermediate membrane potential; terminating an operation of accumulating a second group of signals in the synaptic signals in a second computing cycle following the first computing cycle; and outputting the first intermediate membrane potential as the membrane potential.

In some embodiments, generating the membrane potential further includes operations below: calculating a difference between the first intermediate membrane potential and a threshold value; comparing the difference with a sum of the second group of signals in the synaptic signals; and performing the operation of accumulating the second group of signals in the synaptic signals in the second computing cycle to generate a second intermediate membrane potential as the membrane potential when the sum of the second group of signals is a negative number and an absolute value of the sum of the second group of signals is greater than the difference.

In some embodiments, generating the membrane potential further includes operations below: accumulating a number K of groups of signals in the synaptic signals in a first computing cycle to a K-th computing cycle to generate a first intermediate membrane potential; comparing the first intermediate membrane potential and a threshold value; and terminating an operation of accumulating the remaining signals in the synaptic signals in the (K+1)-th computing cycle when the first intermediate membrane potential is less than the threshold value and a difference between the first intermediate membrane potential and the threshold value is greater than a sum of remaining signals in the synaptic signals in a (K+1)-th computing cycle.

In some embodiments, the method further includes generating an output spike having a value "0" in the output spike signal corresponding to the one of plurality of time steps.

In some embodiments, the method further includes generating an output signal, based on the output spike signal, for an image recognition operation of an input data associated with the spike signals.

In some embodiments, a non-transitory computer-readable medium for storing computer-executable instructions is provided. The computer-executable instructions when executed by a processor implementing a method including: counting a first number of input spikes received in an input layer of a neural network during a first time step; comparing the first number of input spikes with a predetermined count value; when the first number of input spikes is smaller than the predetermined count value, terminating an operation of accumulation associated with input spikes received during the first time step; and generating an output spike having a value "0".

In some embodiments, the method further includes operations below: counting a second number of input spikes received in the input layer of the neural network during a second time step following the first time step; comparing the second number of input spikes with the predetermined count value; and when the second number of input spikes is greater than the predetermined count value, generating multiple synaptic signals by weighting the input spikes received during the second time step.

In some embodiments, the method further includes operations below accumulating a number K of groups of signals in the synaptic signals in a first computing cycle to a K-th computing cycle to generate a membrane potential; calculating a difference between the membrane potential and a threshold value; when the membrane potential is greater than the threshold value and the difference is greater than a sum of the number K of groups of signals in the synaptic signals, terminating an operation of accumulating remaining signals in the synaptic signals in remaining computing cycle; and generating an output spike having a value "1" corresponding to the second time step.

In some embodiments, the method further includes operations below: when the first number of input spikes is greater than the predetermined count value, generating multiple synaptic signals by weighting the input spikes received during the first time step; generating a membrane potential according to the synaptic signals; and generating an output spike in response to comparing the membrane potential with a threshold voltage.

In some embodiments, the method further includes operations below: determining that no spike is received during the first time step; and in response to the determination, generating the output spike having a value "0".

In some embodiments, a neural network system is provided, including a memory, storing multiple program codes and an input data, and a processor, coupled with the memory. The processor runs a spiking neural network and executes operations of: generating a number M of multiple synaptic signals according to multiple spike signals that are received in an input layer of the spiking neural network and associated with an input signal provided for the spiking neural network; accumulating a first synaptic signal to an N-th synaptic signal in the plurality synaptic signals to generate a membrane potential, wherein the number N is smaller than the number M; and outputting, according to the membrane potential and a threshold value, an output spike corresponding to the input signal.

In some embodiments, an absolute value of a sum of the N-th synaptic signal to a M-th synaptic signal in the plurality synaptic signals is smaller than an absolute value of a difference between the membrane potential and the threshold value.

In some embodiments, the processor further executes operations of terminating an operation of accumulating the N-th synaptic signal to a M-th synaptic signal in the plurality synaptic signals.

In some embodiments, the processor further executes operations of counting a number of spikes in the spike signals received during a time step. Generating the synaptic signals further includes weighting the spike signals with multiple synaptic weight values to generate the synaptic signals when the number of spikes in the spike signals is greater than a predetermined count value.

In some embodiments, the processor further executes operations of accumulating the N-th synaptic signals to the M-th synaptic signal to update the membrane potential when a sum of the N-th synaptic signal to a M-th synaptic signal in the plurality synaptic signals is a negative number and an absolute value of the sum of the N-th synaptic signal to the M-th synaptic signal is greater than a difference between the membrane potential and the threshold value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

receiving a plurality of spike signals in an input layer of a spiking neural network during a plurality of time steps;

counting a corresponding number of spikes in the plurality of spike signals for each of the plurality of time steps;

weighting, in response to the corresponding number of spikes in one of plurality of time steps being greater than a predetermined count value, the plurality of spike signals with a plurality of synaptic weight values to generate a plurality of synaptic signals;

generating a membrane potential by accumulating a number N of the plurality of synaptic signals according to a weight distribution of the plurality of synaptic weight values, comprising:

accumulating a number K of groups of signals in the plurality of synaptic signals in a first computing cycle to a K-th computing cycle to generate a first intermediate membrane potential;

comparing the first intermediate membrane potential and a threshold value; and when the first intermediate membrane potential is less than the threshold value and a difference between the first intermediate membrane potential and the threshold value is greater than a sum of remaining signals in the plurality of synaptic signals in a (K+1)-th computing cycle, terminating an operation of accumulating the remaining signals in the plurality of synaptic signals in the (K+1)-th computing cycle; and generating an output spike signal according to the membrane potential.

2. The method of claim 1, further comprising:

when the corresponding number of spikes in a first time step of the plurality of time steps is smaller than the predetermined count value, generating an output spike having a value "0" in the output spike signal corresponding to the first time step of the plurality of time steps.

3. The method of claim 2, wherein the predetermined count value is configured to be obtained by training the spiking neural network.

4. The method of claim 1, wherein the counting the corresponding number of spikes in the plurality of spike signals further comprises:

increasing the corresponding number of spikes for a first time step of the plurality of time steps in response to a first spike signal, in the plurality of spike signals, including a spike having a value "1" in the first time step of the plurality of time steps.

5. The method of claim 1, wherein a number of the plurality of synaptic signals, generated in the operation of weighting the plurality of spike signals, equals to a number M, wherein the number M is different from the number N.

6. The method of claim 1, further comprising:

generating an output spike having a value "0" in the output spike signal corresponding to the one of plurality of time steps.

7. The method of claim 1, further comprising:

generating an output signal, based on the output spike signal, for an image recognition operation of an input data associated with the plurality of spike signals.

8. A non-transitory computer-readable medium for storing computer-executable instructions, the computer-executable instructions when executed by a processor implementing a method comprising:

counting a first number of input spikes received in an input layer of a neural network during a first time step;

comparing the first number of input spikes with a predetermined count value;

when the first number of input spikes is smaller than the predetermined count value, terminating an operation of accumulation associated with input spikes received during the first time step;

generating an output spike having a value "0";

when the first number of input spikes is greater than the predetermined count value, weighting the input spikes with a plurality of first synaptic weight values to generate a plurality of first synaptic signals;

generating a membrane potential, comprising:

accumulating a number K of groups of signals in the plurality of first synaptic signals in a first computing cycle to a K-th computing cycle to generate a first intermediate membrane potential;

comparing the first intermediate membrane potential and a threshold value; and when the first intermediate membrane potential is less than the threshold value and a difference between the first intermediate membrane potential and the threshold value is greater than a sum of remaining signals in the plurality of first synaptic signals in a (K+1)-th computing cycle, terminating an operation of accumulating the remaining signals in the plurality of first synaptic signals in the (K+1)-th computing cycle.

9. The non-transitory computer-readable medium of claim 8, wherein the method further comprises:

counting a second number of input spikes received in the input layer of the neural network during a second time step following the first time step;

comparing the second number of input spikes with the predetermined count value; and when the second number of input spikes is greater than the predetermined count value, generating a plurality of second synaptic signals by weighting the input spikes received during the second time step.

10. The non-transitory computer-readable medium of claim 9, wherein the method further comprises:

accumulating a number M of groups of signals in the plurality of second synaptic signals in a first computing cycle to a M-th computing cycle to generate a second intermediate membrane potential;

calculating a difference between the second intermediate membrane potential and the threshold value;

when the second intermediate membrane potential is greater than the threshold value and the difference is greater than a sum of the number M of groups of signals in the plurality of second synaptic signals, terminating an operation of accumulating remaining signals in the plurality of second synaptic signals in remaining computing cycle; and generating an output spike having a value "1" corresponding to the second time step.

11. The non-transitory computer-readable medium of claim 8, wherein the method further comprises:

determining that no spike is received during the first time step; and in response to the determination, generating the output spike having a value "0".

12. A neural network system, comprising:

a memory, configured for storing a plurality of program codes and an input data;

a processor, coupled with the memory, wherein the processor is configured to run a spiking neural network and to execute operations of:

generating a number M of a plurality of synaptic signals according to a plurality of spike signals that are received in an input layer of the spiking neural network and associated with an input signal provided for the spiking neural network;

accumulating a first synaptic signal to an N-th synaptic signal in the plurality synaptic signals to generate a membrane potential, wherein the number N is smaller than the number M;

outputting, according to the membrane potential and a threshold value, an output spike corresponding to the input signal;

accumulating a number K of groups of signals in the plurality of synaptic signals in a first computing cycle to a K-th computing cycle to generate a first intermediate membrane potential;

comparing the first intermediate membrane potential and the threshold value; and when the first intermediate membrane potential is less than the threshold value and a difference between the first intermediate membrane potential and the threshold value is greater than a sum of remaining signals in the plurality of synaptic signals in a (K+1)-th computing cycle, terminating an operation of accumulating the remaining signals in the plurality of synaptic signals in the (K+1)-th computing cycle.

13. The neural network system of claim 12, wherein an absolute value of a sum of the N-th synaptic signal to a M-th synaptic signal in the plurality synaptic signals is smaller than an absolute value of a difference between the membrane potential and the threshold value.

14. The neural network system of claim 12, wherein the processor is further configured to execute operations of:

terminating an operation of accumulating the N-th synaptic signal to a M-th synaptic signal in the plurality synaptic signals.

15. The neural network system of claim 12, wherein the processor is further configured to execute operations of:

counting a number of spikes in the plurality of spike signals received during a time step;

wherein the generating the plurality of synaptic signals further comprises:

when the number of spikes in the plurality of spike signals is greater than a predetermined count value, weighting the plurality of spike signals with a plurality of synaptic weight values to generate the plurality of synaptic signals.

16. The neural network system of claim 12, wherein the processor is further configured to execute operations of:

when a sum of the N-th synaptic signal to a M-th synaptic signal in the plurality synaptic signals is a negative number and an absolute value of the sum of the N-th synaptic signal to the M-th synaptic signal is greater than a difference between the membrane potential and the threshold value, accumulating the N-th synaptic signals to the M-th synaptic signal to update the membrane potential.

17. The method of claim 1, wherein the number K is different from the number N.

18. The method of claim 1, wherein the number K is smaller than the number N.

19. The method of claim 1, further comprising:

outputting the first intermediate membrane as the membrane potential.

20. The method of claim 1, further comprising:

when the first intermediate membrane potential is greater than the threshold value, generating an output spike having a value "0" in the output spike signal.

* * * * *